United States Patent
Arimoto et al.

(10) Patent No.: US 9,575,187 B2
(45) Date of Patent: Feb. 21, 2017

(54) RADIATION IMAGE DETECTING DEVICE AND PROCESS FOR PRODUCING THE SAME

(71) Applicant: Konica Minolta, Inc., Tokyo (JP)

(72) Inventors: Tadashi Arimoto, Tokyo (JP); Takehiko Shoji, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 76 days.

(21) Appl. No.: 14/725,393

(22) Filed: May 29, 2015

(65) Prior Publication Data
US 2015/0346358 A1  Dec. 3, 2015

(30) Foreign Application Priority Data
Jun. 3, 2014  (JP) .................................. 2014-114888

(51) Int. Cl.
*G01T 1/20* (2006.01)
*G01T 1/202* (2006.01)

(52) U.S. Cl.
CPC ................. *G01T 1/20* (2013.01); *G01T 1/201* (2013.01); *G01T 1/202* (2013.01)

(58) Field of Classification Search
CPC ............ G01T 1/20; G01T 1/201; G01T 1/202
USPC ............................................. 250/361 R, 367
See application file for complete search history.

(56) References Cited

U.S. PATENT DOCUMENTS

| | | | | |
|---|---|---|---|---|
| 8,368,025 B2* | 2/2013 | Kasai | ................... | C09K 11/628 250/361 R |
| 8,669,526 B2* | 3/2014 | Kasai | ................... | C09K 11/628 250/361 R |
| 2013/0068953 A1* | 3/2013 | Itaya | .................... | A61B 6/4208 250/368 |
| 2014/0361182 A1* | 12/2014 | Hasegawa | ............... | G01T 1/202 250/367 |

FOREIGN PATENT DOCUMENTS

| | | |
|---|---|---|
| JP | 2006078471 A | 3/2006 |
| JP | 2011033562 A1 | 2/2011 |

* cited by examiner

*Primary Examiner* — David Porta
*Assistant Examiner* — Meenakshi Sahu
(74) *Attorney, Agent, or Firm* — Lucas & Mercanti, LLP

(57) ABSTRACT

The present invention provides a radiation image detecting device which suppresses occurrence of image irregularities and reduction of sharpness by joining a planar light-receiving device and a scintillator panel so that the distance between the planar light-receiving device and the scintillator panel via an adhesive layer is uniform in plane. The present invention also provides a process for producing the radiation image detecting device. The radiation image detecting device includes, in order, a scintillator panel including a support and a scintillator layer on the support, the scintillator layer having a film-thickness distribution; an adhesive layer; and a planar light-receiving device. In the radiation image detecting device, at least one of the support and the planar light-receiving device bends, so that the scintillator panel and the planar light-receiving device are arranged in plane via the adhesive layer at uniform distance.

16 Claims, 4 Drawing Sheets

73

69

71

13

RADIATION IMAGE DETECTING DEVICE AND PROCESS FOR PRODUCING THE SAME

CROSS REFERENCE TO RELATED APPLICATION

This U.S. patent application claims priority under the Paris Convention of Japanese Patent Application No. 2014-114888 filed on Jun. 3, 2014, the entirety of which is incorporated herein by reference.

BACKGROUND OF THE INVENTION

1. Field of the Invention

The present invention relates to a radiation image detecting device for use in a medical diagnosis device, a non-destructive testing device, or the like.

2. Description of the Related Art

Recently, digital radiation image detecting devices have appeared, which are typified by a computed radiography (CR) and a flat panel detector (FPD). These devices can directly obtain digital radiation images and cause image display devices, such as a cathode-ray tube and a liquid crystal panel, to display the images. Consequently, the digital radiation image detecting devices have considerably enhanced the convenience of diagnostic operations in hospitals, clinics, and the like.

Further, a flat panel detector (FPD) has been developed which uses thin-film transistors (TFTs) or charge-coupled devices (CCDs), as a new digital radiation image technique.

Regarding these radiation image detecting devices, a radiation image detecting device is known, which has an imaging panel formed by bonding together a sensor panel (planar light-receiving device) on which light-receiving elements, such as thin-film transistors (TFTs) or charge-coupled devices (CCDs), are arranged two-dimensionally, and a scintillator panel in which a scintillator layer for converting radiation into light detectable by the light-receiving elements is formed on a support.

It is disclosed that the above radiation image detecting device is equipped with the sensor panel, the scintillator layer for converting radiation into light, and a scintillator protecting member made of a hot-melt resin (see, e.g., Patent Document 1). The Patent Document 1 describes that a scintillator panel and a sensor panel are bonded together via a scintillator protecting layer made of a hot-melt resin. Patent Document 2 discloses a radiation image detecting device having an imaging panel formed by bonding together a scintillator panel and a sensor panel via a hot-melt resin serving as an adhesive layer.

Here, both of the Patent Documents 1 and 2 describes that a material made of CsI(Tl) having a columnar crystal structure is used as a scintillator layer. Generally, such a scintillator layer is formed by a gas-phase method. However, when a scintillator layer having a large size of, e.g., 430 mm×430 mm is formed by a gas-phase method, a film-thickness distribution inevitably occurs in plane. And, when the scintillator layer having a film-thickness distribution is adhesively bonded to the flat sensor panel, the distance between both of the layers is uneven in plane due to the film-thickness distribution in the scintillator layer. Thus, image irregularity occurs. In addition, a thin-film-thickness part of the scintillator layer is difficult to be intimately bonded to the adhesive layer. Accordingly, there is a problem that the thin-film-thickness part of the scintillator layer peels off the adhesive layer. From the viewpoint of image quality, the thinner the adhesive layer, the better. However, the thinner the adhesive layer, the more serious the above problem.

CITATION LIST

Patent Document 1: Japanese Patent Application Laid-Open Publication No. 2006-78471
Patent Document 2: Japanese Patent Application Laid-Open Publication No. 2011-33562

SUMMARY OF THE INVENTION

The present invention aims at providing a radiation image detecting device which suppresses occurrence of image-irregularity or reduction of image-sharpness by joining a planar light-receiving device and a scintillator panel so that the distance therebetween via an adhesive layer is uniform in plane, and a process for producing the radiation image detecting device.

The present invention includes the following aspects.

A radiation image detecting device according to the present invention includes, in order, a scintillator panel including a support and a scintillator layer on the support, the scintillator layer having a film-thickness distribution; an adhesive layer; and a planar light-receiving device, wherein at least one of the support and the planar light-receiving device bends, so that the scintillator panel and the planar light-receiving device are arranged in plane via the adhesive layer at uniform distance.

It is preferable that, when the elastic modulus of the support, on which the scintillator layer is formed, is defined as E1 (GPa) and the film-thickness of the support is defined as d1 (mm), an angle of maximum slope θ of a surface of the scintillator layer to a plane direction of the scintillator layer satisfies the relation expressed by the following expression (1).

$$\tan \theta \times E1 \times d1 \leq 0.1 \tag{1}$$

Alternatively, it is preferable that, when the elastic modulus of the planar light-receiving device is defined as E2 (GPa) and the film-thickness of the planar light-receiving device is defined as d2 (mm), an angle of maximum slope θ of a surface of the scintillator layer to a plane direction of the scintillator layer satisfies the relation expressed by the following expression (2).

$$\tan \theta \times E2 \times d2 \leq 0.1 \tag{2}$$

It is preferable that the film-thickness of the adhesive layer ranges from 1 μm to 30 μm.

It is preferable that the adhesive layer is a layer containing one type or two or more types of hot-melt resins.

It is preferable that the adhesive layer is a laminated body of two or more types of layers, and that the two or more types of layers are formed of hot-melt resins differing in melting point from one another.

It is preferable that, in the laminated body, a melting point of the hot-melt resin forming a layer touching the scintillator layer is higher than a melting point of the hot-melt resin forming a layer touching the planar light-receiving device.

It is preferable that the adhesive layer contains, in addition to the one type or two or more types of hot-melt resins, a spacer particle having a particle diameter comparable to the film-thickness of the adhesive layer and having a refractive index comparable to that of the hot-melt resins.

It is preferable that the scintillator layer is formed by vapor-deposition, and that the scintillator layer is formed by vapor-depositing a phosphor material including cesium iodide and at least one type of an activator agent.

It is preferable that the support or a substrate configuring the planar light-receiving device is configured by a glass plate or a resin film as a main component. It is more preferable that the support or the substrate is configured by a resin film as a main component.

A process for producing a radiation image detecting device according to the present invention is a process wherein the radiation image detecting device includes, in order, a scintillator panel including a support and a scintillator layer on the support, the scintillator layer having a film-thickness distribution; an adhesive layer; and a planar light-receiving device, and wherein the process includes a step of joining the scintillator panel to the planar light-receiving device under heat from 50° C. to 150° C. so that the distance between the scintillator panel and the planar light-receiving device via the adhesive layer is uniform in plane.

The adhesive layer is a layer containing one type or two or more types of hot-melt resins. It is preferable that the melt-viscosities of the hot-melt resins range from 100 Pa·s to 100,000 Pa·s.

It is preferable that the joining of the scintillator panel to the planar light-receiving device is performed, in addition to under heat from 50° C. to 150° C., under pressure of 10,000 Pa to 1,000,000 Pa.

According to the present invention, when the planar light-receiving device and the scintillator panel are joined to each other, at least one of the support and the planar light-receiving device is bent according to the film-thickness distribution of the columnar crystal on the scintillator layer. Consequently, the scintillator panel and the planar light-receiving device can be joined to each other so that the distance between the planar light-receiving device and the scintillator panel via the adhesive layer is uniform in plane. Accordingly, according to the present invention, a radiation image detecting device can be provided, which shows good image-sharpness and suppresses image irregularities.

DESCRIPTION OF THE PREFERRED EMBODIMENTS

Figure 1:
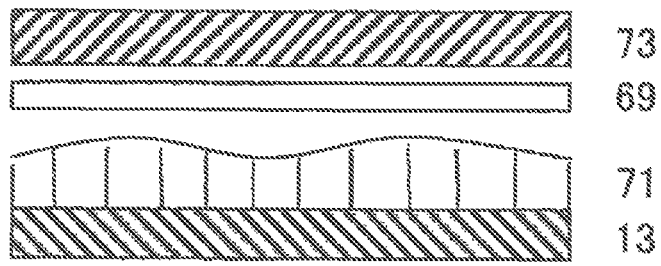
FIG. 1 is a diagram illustrating the arrangement of a scintillator panel including a support and a scintillator layer, an adhesive layer, and a planar light-receiving device, in a radiation image detecting device according to the present invention.
Figure 2:
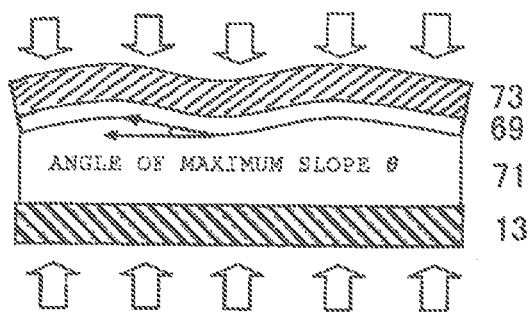
FIG. 2 is a diagram illustrating that at least one of the support and a planar light-receiving device bends in the radiation image detecting device according to the present invention thereby to make the scintillator panel and the planar light-receiving device appressed to each other.
Figure 2:
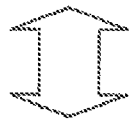
Figure 2:
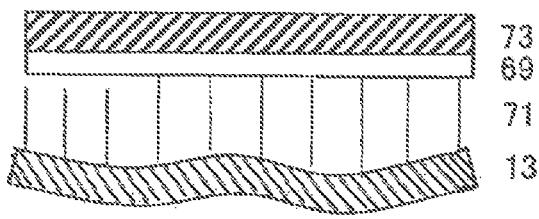

A radiation image detecting device according to the present invention has a configuration in which a scintillator panel and a planar light-receiving device are joined so that the distance therebetween via an adhesive layer is uniform in plane. The radiation image detecting device is produced by joining the scintillator panel including a support and a scintillator layer on the support, the scintillator layer having a film-thickness distribution, to the planar light-receiving device via the adhesive layer. The radiation image detecting device is featured in that the scintillator panel is joined to the planar light-receiving device under heat from 50° C. to 150° C. so that the distance between the scintillator panel and the planar light-receiving device via the adhesive layer is uniform in plane. FIGS. 1 and 2 illustrate the arrangement of the scintillator panel, the planar light-receiving device, and the adhesive layer. In addition, FIGS. 1 and 2 illustrate that at least one of the support and the planar light-receiving device bends thereby to make the scintillator panel and the planar light-receiving device appressed to each other.

When the elastic modulus of the support configuring the radiation image detecting device is defined as E1 (GPa) and the film-thickness of the support is defined as d1 (mm), an angle of maximum slope θ of a surface of the scintillator layer to a plane direction of the scintillator layer satisfies the relation expressed by the following expression (1).

$$\tan \theta \times E1 \times d1 \leq 0.1 \tag{1}$$

Alternatively, it is preferable that when the elastic modulus of the planar light-receiving device is defined as E2 (GPa) and the film-thickness of the planar light-receiving device is defined as d2 (mm), an angle of maximum slope θ of a surface of the scintillator layer to a plane direction of the scintillator layer satisfies the relation expressed by the following expression (2).

$$\tan \theta \times E2 \times d2 \leq 0.1 \tag{2}$$

Here, as illustrated in FIG. 2, the angle of maximum slope θ is defined as an angle of a point on a surface of the scintillator layer having a film-thickness distribution, at which the average level difference between a top point and a bottom point adjoining the top point is maximized, to a plane direction of the scintillator layer, that is, an angle of a point of maximum slope to the plane direction of the scintillator layer. The larger the angle of maximum slope θ of the surface of the scintillator layer, the more largely the planar light-receiving device or the support is needed to be bent when the scintillator panel and the planar light-receiving device are joined to each other.

On the other hand, the smaller the film-thickness (d1 or d2) of the support or the planar light-receiving device, the more favorably the support or the planar light-receiving device bends. Further, the smaller the elastic modulus (E1 or E2) of the support or the planar light-receiving device, the more favorably the support or the planar light-receiving device bends.

Accordingly, even if the irregularity of the surface of the columnar crystal on the surface of the scintillator layer is large, reduction in the film-thickness (d1, d2) or the elastic modulus (E1, E2) of the support or the planar light-receiving device enables joining the scintillator panel and the planar light-receiving device so that the distance therebetween via the adhesive layer is uniform in plane.

The above features of the present invention are achieved by the following configurations. A radiation image detecting device according to the invention and a process for producing such a device are described in detail below.

[Scintillator Panel]
<Support>

A support configuring the scintillator panel is a substrate that is transmissive to radiations such as X-rays and that can support the scintillator layer.

Exemplary materials of the support include various glasses, ceramics, semiconductors, polymer materials, carbon materials, and metals, which are transmissive to radiations such as X-rays. Specifically, the following materials are used. That is, the materials include plates of glasses such as quartz, borosilicate glass and chemically reinforced glass; ceramic members such as sapphire, silicon nitride and silicon carbide; semiconductors such as silicon, germanium, gallium arsenide, gallium phosphide and gallium nitride; polymer materials such as cellulose ester (cellulose acetate and the like), polyester, polyamide, polyimide, acetate fibers, polycarbonate, polyether imide, aramid, polysulfone, polyether sulfone, and bio-nanofiber; composite materials such as amorphous carbon, carbon fiber reinforced plastics (CFRP), glass fiber reinforced plastics (GFRP), sheets obtained by forming glass fibers like a non-woven fabric, and metallic materials such as metals such as aluminum, iron, and copper, and alloys thereof or oxides of the metals. Among such materials, plates of glass, or polymer materials are preferable. From the viewpoint of flexibility, polymer materials are more preferable. Resin films made of polymer materials are particularly preferable.

The elastic modulus of the materials of the support ranges usually from 0.1 GPa to 300 GPa, preferably from 1 GPa to 200 GPa. Here, the "elastic modulus" is a value obtained using a tensile tester, and by calculating the slope of a graph showing stress versus amount of strain indicated by a marked line on a test specimen, in a range in which a stress-strain graph shows a straight relation. This value is called the Young's modulus. In the present specification, such a Young's modulus is defined as the elastic modulus.

Specifically, a resin film having an elastic modulus ranging from 1 GPa to 20 GPa is preferable. If the elastic modulus of the material of the support is within the above range, the scintillator layer can stably be held.

Polymer materials configuring the resin films include, e.g., polyethylene naphthalate (6 GPa to 8 GPa), polyethylene terephthalate (3 GPa to 5 GPa), polycarbonate (1 GPa to 3 GPa), polyimide (6 GPa to 8 GPa), polyetherimide (2 GPa to 4 GPa), aramid (11 GPa to 13 GPa), polysulfone (1 GPa to 3 GPa) and polyether sulfone (1 GPa to 3 GPa) (in brackets, values of the elastic modulus are indicated). Incidentally, the values of the elastic modulus may vary with the forms of the resin films. Thus, the elastic modulus does not always have values indicated in the brackets. However, examples of the value of the elastic modulus are indicated in the brackets as a guide.

All of the above resin films are preferable in having high heat-resistance and in being capable of withstanding vapor-deposition for forming the scintillator layer. Among the above resin films, polyimides particularly excel in heat-resistance and are suitable for a case where columnar crystals of phosphor are formed on the support by a gas-phase method using phosphor materials including cesium iodide (CsI).

Further, if the support is a film made of bio-nanofibers, advantages due to the characteristics and environmental friendliness of the support can be provided, because the film made of bio-nanofibers has characteristics that cannot be possessed by existing glasses or plastics, e.g., (i) low weight, (ii) strength five times or higher than iron (high strength), (iii) resistance to thermal expansion (low thermal expansibility), (iv) being flexible (excellent in flexibility), (v) variety of processing such as mixing, coating, and film-forming, to be performed on bio-nanofibers, and (vi) combustibility due to the fact that the bio-nanofibers are plant fiber materials.

The thickness of the support ranges usually from 1 μm to 1000 μm, preferably from 10 μm to 500 μm, and more preferably from 10 m to 200 μm. In a case where the thickness of the support is within the above range, even if the support is made of a material, such as glass or metal, which has a large elastic modulus, when the planar light-receiving device and the scintillator panel are joined to each other, the support can effectively be bent according to the film-thickness distribution of the scintillator layer. Thus, the planar light-receiving device and the scintillator layer can be joined to each other so that the distance therebetween via an adhesive layer is uniform in plane.

Incidentally, in the scintillator panel according to the present invention, two or more types of different supports may be bonded to one another. In this case, it is advisable to use the values of the thickness and the elastic modulus of a support, the material of which has a largest elastic modulus, among a plurality of supports, as the thickness d1 of the support and the elastic modulus E1 of the support, which are used in equation (1).

<Scintillator Layer>

Figure 3:
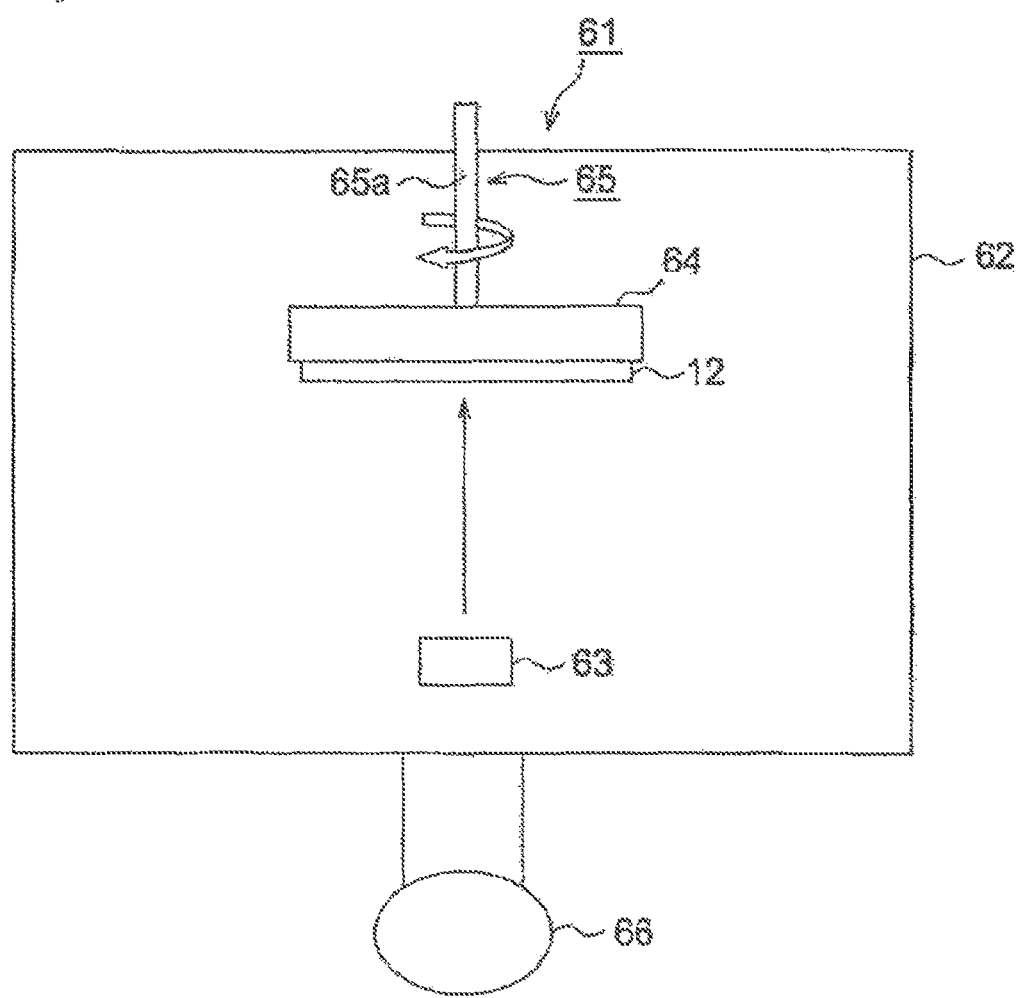
FIG. 3 is a diagram illustrating an outline configuration of a vapor-deposition apparatus.

The scintillator layer is a phosphor layer which is provided on the support, includes columnar crystals, and has a film-thickness distribution. The film-thickness distribution is a distribution of irregularity of the film-thickness of the scintillator layer, which is caused by a liquid phase method, such as an application method, or a gas-phase method, such as a vapor-deposition method. The distance between a mountain-top and a valley-bottom adjoining the mountain is usually 100 mm to 300 mm or so. For example, in a case where a scintillator layer is provided on a support by vapor-deposition using an apparatus as illustrated in FIG. 3, the film-thickness distribution of the scintillator layer is generally generated concentrically around a rotating shaft of the support. In this case, an angle of maximum slope θ of the scintillator layer can be obtained by, e.g., the following procedure.

1. The film-thickness of the scintillator layer on a straight line passing through the center of the rotating shaft of the support is measured at a pitch of 10 mm. Then, a graph is made, in which the axis of abscissa is a distance from the center of the rotating shaft, and the axis of ordinate is the film-thickness of the scintillator layer.

2. The maximum slope of a curve representing the film-thickness of the scintillator layer is read from the graph. An angle corresponding to the maximum slope is defined as the angle of maximum slope θ.

On the other hand, in a case where the scintillator layer is formed by the liquid-phase method such as an application, the film-thickness distribution of the scintillator layer in a direction (MD-direction (i.e., Machine Direction)) of conveying the support, and that of the scintillator layer in a direction (TD-direction (i.e., Transverse Direction)) perpendicular to the MD-direction are measured. Thus, the angle of maximum slope θ can be obtained by a procedure similar to the above procedure.

Incidentally, there is no particular restriction to the method of measuring the film-thickness of the scintillator layer. A commercially available contact-type or eddy-current-type film-thickness meter may be used. Alternatively, the film-thickness may be read from an image taken by an electronic microscope or the like.

The phosphor material configuring the scintillator layer includes, in addition to terbium-activated gadolinium oxysulfide ($Gd_2O_2S(Tb)$) and silver-activated zinc sulfide ($ZnS(Ag)$), a material obtained by adding, to cesium iodide (CsI), at least one type of an activator agent selected from a group of indium (In), thallium (Tl), lithium (Li), potassium (K), rubidium (Rb) and sodium (Na). Among these materials, a material obtained by adding at least one type of an activator agent to cesium iodide (CsI) is preferable.

Particularly, because radiation absorption and luminance efficiency are high, and a high quality image with low noise can be obtained, sodium-activated cesium iodide (CsI(Na)), thallium-activated cesium iodide (CsI(Tl)), and the like are preferable. From the viewpoint that thallium-activated cesium iodide (CsI(Tl)) has emission wavelengths of a wide range of 300 nm to 750 nm, that thus, a rate of changing X-rays into visible light-rays is relatively high, that columnar crystals are readily formed by vapor-deposition, and that emitted light is suppressed due to light guide effects from being scattered in the crystals, so that the thickness of the scintillator layer can be increased correspondingly, thallium-activated cesium iodide (CsI(Tl)) is more preferable.

Incidentally, it is preferable that the content of the activator agent added to gadolinium oxysulfide ($Gd_2O_2S$), zinc sulfide (ZnS) or cesium iodide (CsI) is 0.1 mol % to 5 mol %, when the content of a phosphor used as a base-material is taken as 100 mol %.

When receiving radiation such as X-ray, the scintillator layer absorbs the energy of the radiation, so that electromagnetic waves are generated, whose wavelengths range from 300 nm to 800 nm, that is, electromagnetic waves ranging from ultraviolet light to infrared light, which include mainly visible light, are generated.

In a case where the phosphor is a columnar crystal, the column diameter of the columnar crystal is usually 2 μm to 20 μm, and preferably 3 μm to 15 μm.

The film-thickness of the scintillator layer is usually 100 μm to 1,000 μm, preferably 100 μm to 600 μm, and more preferably 200 μm to 600 μm.

The filling rate of the scintillator layer is usually 70% to 90%, preferably 72% to 88%, and more preferably 75% to 85%. Incidentally, the "filling rate" refers to a value obtained by dividing the actual mass of the scintillator layer by a theoretical density and an apparent volume.

<Other Layers>

A reflection layer may be provided between the support and the scintillator, if necessary. The provision of the reflection layer enables highly efficient extraction of light emitted from the phosphor. Thus, luminance is greatly enhanced.

The reflection layer can be formed using a material including, e.g., one or more types of elements selected from a group of aluminum, silver, platinum, palladium, gold, copper, iron, nickel, chrome, cobalt, and stainless steel, or an alloy thereof. From the viewpoint of high reflectance, silver, aluminum, or an alloy containing silver or aluminum as a major component is preferable. Alternatively, two or more layers of such a metal film may be formed. In the case of forming two or more layers of a metal film, from the viewpoint of improving adhesion to the support, it is preferable that a bottom layer is formed of a metal film containing nickel (Ni), or chrome (Cr), or both of nickel and chrome. Alternatively, the reflectance may be further enhanced by providing layers made of metal oxides, such as silica ($SiO_2$) and titanium dioxide ($TiO_2$), on the metal film in this order. Methods of forming the above metal layer on the support include, e.g., vapor-deposition, sputtering, or bonding of metal foils, but are not particularly limited. From viewpoint of adhesiveness, sputtering is most preferable.

On the other hand, the reflection layer may be made of light-scattering particles and a binder resin.

As long as the material of the light-scattering particle is a granular material having a refractive index different from that of the binder resin configuring the reflection layer, the light-scattering particle is not limited to a specific material. Materials of the light-scattering particle include, for example, alumina, yttrium oxide, zirconium oxide, titanium dioxide, barium sulfate, silica, zinc oxide, calcium carbonate, glass, and resin. These materials may be used singly, or two or more thereof may be used in combination as a mixture. Among these materials, titanium dioxide is particularly preferable, because titanium dioxide is easily available and has a high refractive index.

The titanium dioxide may have any of crystal structures of rutile, brookite and anatase forms. However, the titanium dioxide having a crystal structure of the rutile form is particularly preferable, because of the facts that a ratio of the refractive index of such titanium dioxide to the refractive index of binder resins is large, and that such titanium dioxide can achieve high luminance, and from the viewpoint of the reflectance with respect to visible light.

From the viewpoint of reflectance, the area-average particle diameter of the light-scattering particles is preferably 0.1 μm to 5.0 μm, and more preferably 0.2 μm to 3.0 μm. In order to improve the affinity and dispersibility to binder resins, or in order to suppress the degradation of the binder resin, the titanium oxide surface-treated with oxides of metals, such as aluminum (Al), silica (Si), zirconium (Zr) and zinc (Zn) is particularly preferable.

In 100 vol % of the total volume of the components configuring the reflection layer, the volume fraction of the light-scattering particles included therein is preferably 3 vol % to 90 vol %, and more preferably 10 vol % to 50 vol %. If the light-scattering particles are included in the reflection layer so that the volume fraction of the light-scattering particles is within such a range, the reflectance of the reflective layer, and the sensitivity of the scintillator panel having the scintillator layer formed on the support are improved. In addition, the adhesion of the reflection layer to the support or the scintillator layer is enhanced. Thus, even during cutting, the reflection layer does not break away. Consequently, productivity can be enhanced.

The binder resins which can be used in the reflection layer include, for example, polyurethane resins, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinylbutyrals, polyester resins, cellulose derivatives (such as nitrocellulose), styrene butadiene copolymers, various synthetic rubber resins, phenolic resins, epoxy resins, urea resins, melamine resins, phenoxy resins, silicone resins, acrylic resins, and urea formamide resins. Among these resins, hydrophobic resins, such as polyester resins, polyurethane resins and acrylic resins, are preferable, because of excellent film sticking properties with respect to columnar phosphor crystals formed by vapor-deposition and to the support.

In order to enhance the adhesion between the support and the light reflection layer, an intermediate layer may be disposed between the support and the light reflection layer. It is preferable that the intermediate layer is a layer containing a resin such as a polyurethane resin, a polyester resin, and a vinyl chloride copolymer.

Incidentally, in the present specification, the support, or a member having the support and a functional layer, such as the light reflection layer, provided on the support is sometimes referred to as a "substrate for vapor-deposition" or simply as a "substrate".

<Scintillator Panel>

The scintillator panel according to the present invention includes the support, the scintillator layer formed on the support, and optional other layers.

For example, in the case of forming columnar crystals of a phosphor, the scintillator layer can be divided into the two groups: that which has a configuration (first configuration) including a plurality of columnar crystals, whose root portions contacted with the support exist independent of one another, and that which has another configuration (second configuration) in which a plurality of columnar crystals configuring the scintillator layer have root portions that are contacted with the support and exist in a non-columnar crystal shape without being independent of one another, and in which higher parts of the columnar crystals above the root portions exist independent of one another. In any of the first and second configurations, the independence of the columnar crystals is high, and the columnar crystals do not stick to one another. Consequently, the flexibility of the scintillator layer can be enhanced.

Here, a method of forming the scintillator layer having the first configuration is described.

As long as a phosphor material can be shaped into columnar crystals and formed so that the root portions of the columnar crystals exist independent of one another, there is no particular restriction on the method of forming the scintillator layer. However, a gas-phase method, more specifically, a vapor-deposition method is preferable.

There is no particular limitation to an apparatus used for a vapor-deposition method. However, it is preferable to use a vapor-deposition apparatus illustrated in FIG. 3.

A vapor-deposition apparatus 61 has a box-like vacuum container 62 in which a boat (crucible) 63 serving as a vapor-deposition source is placed. The boat 63 is placed in a container provided with a heating device, and is heated by operating the heating device. When a scintillator layer is formed, a phosphor material including a phosphor and an activator is loaded into the container provided with the heating device. The phosphor material is heated and vaporized by the boat 63 by operating the heating device. The heating temperature for the boat 63 is usually 650° C. to 800° C., and preferably 680° C. to 750° C.

Usually, tantalum (Ta) or the like is used in the boat 63. However, a resistance-heating crucible made from a high-melting-point metal such as alumina or the like may be used.

A substrate holder 64 holding a substrate for vapor-deposition 12 is placed just above the boat 63 in the vacuum container 62.

A heater (not shown) is placed in the substrate holder 64. The substrate for vapor-deposition 12 provided in the substrate holder 64 can to be heated by operating the heater. When the substrate for vapor-deposition 12 is heated, substances adsorbed to the surface of the substrate 12 can be detached or removed. Further, an impurity layer can be prevented from being formed between the substrate 12 and the scintillator layer. Moreover, the adhesion between the substrate 12 and the scintillator layer formed on the surface of the substrate 12 is increased. Furthermore, the film-quality of the scintillator layer 12 formed on the substrate 12 can be controlled.

The substrate holder 64 is provided with a rotating mechanism 65 rotating the substrate holder 64. The rotating mechanism 65 includes a rotating shaft 65a connected to the substrate holder 64, and a motor (not shown) serving as a driving source therefor. When causing the motor to drive, the rotating shaft 65a rotates and thus causes the substrate holder 64 to rotate while being opposed to the boat 63.

In addition to the above constructional elements, the vapor-deposition apparatus 61 includes a vacuum pump 66 connected to the vacuum container 62. The vacuum pump 66 performs evacuation of a gas from and introduction of a gas to the inside of the vacuum container 62. The inside of the vacuum container 62 can be maintained in a constant pressure gas atmosphere by operating the vacuum pump 66. The vacuum pump 66 evacuates a gas present inside the vacuum container 62. In order to evacuate the vacuum container 62 to a high-vacuum region, two or more types of vacuum pumps 66 having different operating pressure regions may be placed. Rotary pumps, turbo molecular pumps, cryogenic pumps, diffusion pumps, mechanical boosters, or the like may be used as the vacuum pumps 66.

The scintillator layer is formed as follows. That is, a phosphor material is loaded into the container provided with a heating device. Then, the vapor-deposition apparatus 61 is evacuated. Simultaneously, an inert gas, such as a nitrogen-gas, is introduced from an inlet to adjust the pressure at approximately 1.333 Pa to $1.33 \times 10^{-3}$ Pa. Then, the phosphor material is heated and vaporized. Thus vapor-deposition crystals are deposited on the surface of the substrate for vapor-deposition 12.

The crystal diameters of the columnar phosphor crystals formed on the substrate for vapor-deposition 12 may be controlled by changing the temperature of the substrate for vapor-deposition 12. The higher the temperature of the substrate for vapor-deposition 12, the larger the crystal diameters. During the vapor-deposition of the scintillator layer, it is preferable that the temperature of the substrate for vapor-deposition 12 is maintained usually 150° C. to 250° C., and preferably 180° C. to 220° C.

The thickness of the scintillator layer may be adjusted by changing the amount of the phosphor material loaded into the container provided with a heating device for forming a scintillator layer, or by opening or closing a shutter. It is preferable to start heating the substrate for vapor-deposition 12 when forming the scintillator layer. When forming the scintillator layer, it is preferable that the temperature of the substrate for vapor-deposition 12 is set to 100° C. or higher at the start of the formation of the scintillator layer, and is then maintained at 150° C. to 250° C. until the vapor-deposition is completed.

<Adhesive Layer>

The adhesive layer is used for joining together the scintillator panel and the planar light-receiving device. Particularly, it is featured that the adhesive layer and the scintillator layer are directly adhesively-bonded to each other. If the adhesive layer and the scintillator layer are not directly adhesively-bonded to each other, for example, in a case where there is an air layer between the adhesive layer and the scintillator layer, or where there is a protection layer or a moisture-proof layer for the scintillator layer, it is feared that light emitted from the scintillator layer may be scattered until reaching the planar light-receiving device, and that thus image-quality may be degraded.

The adhesive layer is required to be transparent to the wavelength of light emitted from the scintillator layer in order that light emitted from the scintillator layer by irradiation of radiation can efficiently reach the planar light-receiving device via the adhesive layer. Specifically, the transmissivity of the adhesive layer to the wavelength of light emitted from the scintillator layer is usually 70% or higher, preferably 80% or higher, and more preferably 90% or higher.

It is preferable that, for example, a hot-melt sheet, a pressure sensitive adhesive sheet, or the like is used as the material configuring the adhesive layer.

Here, the hot melt sheet is a sheet obtained by forming, into a sheet-like shape, an adhesive resin (hot-melt resin) which does not contain water or solvents, is solid at room temperature, and includes a nonvolatile thermoplastic material. Adherends can be joined to each other via the hot-melt sheet by inserting the hot-melt sheet between the adherends, then melting the hot-melt sheet at a temperature that is equal to or higher than the melting point thereof, and then solidifying the molten resin at a temperature that is equal to or lower than the melting point.

Because the hot-melt sheet does not contain water or solvents, the hot-melt resins do not cause deliquescence of a scintillator layer even when the hot-melt sheet is contacted with a deliquescent scintillator layer (e.g., a scintillator layer made of CsI(Na) or CsI(Tl)). Therefore, the hot-melt sheet is suitable for joining a scintillator panel and a planar light-receiving device to each other.

Further, the hot-melt sheet does not contain residual volatile substances and thus exhibit small shrinkage when dried after the scintillator panel and the planar light-receiving device are joined to each other. Thus, the hot-melt sheet excels in dimensional stability.

It is necessary that when the scintillator panel and the planar light-receiving device are bonded to each other using a hot-melt sheet, the holt-melt sheet melts at appropriate temperature, and that the hot-melt sheet does not melt in a market environment.

Particularly, the melting point of the hot-melt resin configuring the adhesive layer is usually 50° C. to 150° C., preferably 60° C. to 120° C., and more preferably 60° C. to 90° C. When the lower limit of the melting point of the hot-melt resin is set to be within the above range, the adhesive layer does not melt during transport, use, and storage. Furthermore, setting the upper limit of the melting point of the hot-melt resin to be within the above range can reduce thermal shrinkage accompanied by cooling after the adhesive layer is heated and melted. Thus, warpage of the joined scintillator panel and/or the planar light-receiving device can be suppressed.

For the viewpoint of adhesiveness, it is necessary that the hot-melt sheet is heated and melted to thereby adhere tightly to the scintillator panel and the planar light-receiving device. Further, from the viewpoint of image quality, it is desirable that the hot-melt resin does not deeply penetrate into between the columnar crystals of the scintillator layer. From the above viewpoint, the melt viscosity of the hot-melt resin configuring the adhesive layer is usually 100 Pa·s to 100,000 Pa·s, preferably 1,000 Pa·s to 100,000 Pa·s, and more preferably 1,000 Pa·s to 10,000 Pa·s. Setting the lower limit of the melt viscosity to be within the above range enables the appropriate control of the penetration of the adhesive agent into between the columnar crystals of a phosphor. Further, setting the upper limit of the melt viscosity to be within the above range enables that the adhesive agent adheres tightly to the adherends. Thus, desirable adhesiveness can be ensured.

The depth of penetration of the adhesive agent into between the columnar crystals of a phosphor is preferably 1 μm to 50 μm, and more preferably 5 μm to 30 μm. Setting the lower limit of the depth of penetration to be within the above range enables that the adhesiveness between the adhesive agent and the columnar crystal of a phosphor is ensured. Setting the upper limit of the depth of penetration to be within the above range enables that light emitted from a phosphor is suppressed from being scattered between the columnar crystals. Thus, favorable image-quality (especially, sharpness) can be obtained.

The hot-melt resins may be used which contain, e.g., a polyolefin resin, a polyamide resin, a polyester resin, a polyurethane resin, or an acrylic resin, as a main component. Among these hot-melt resins, from the viewpoint of light transmissivity, a moisture-proof property, and adhesiveness, the hot-melt resin containing a polyolefin resin as a main component is preferable. Examples of the polyolefin resin that may be used include an ethylene-vinyl acetate copolymer (EVA), an ethylene-acrylic acid copolymer (EAA), an ethylene-acrylate ester copolymer (EMA), an ethylene-methacrylic acid copolymer (EMAA), an ethylene-methacrylate ester copolymer (EMMA), and an ionomer resin. The melting points of resins can optionally be adjusted by controlling the monomer ratios of the copolymers. For example, in the case of the EVA-based hot-melt resin, the melting point can be adjusted to a range of 110° C. to 60° C. by setting the content by weight of vinyl acetate to 1% to 40%. Incidentally, these resins may be used as what is called a polymer blend obtained by a combination of two or more types of resins.

The adhesive layer may be a layer formed of a hot-melt sheet containing one type of a hot-melt resin or two or more types of hot-melt resins differing in the melting point from one another. Alternatively, the adhesive layer may be formed of a laminated body of two or more layers of hot-melt sheets, which layers are made of hot-melt resins differing in the melting point from one another. In the case where the adhesive layer is a laminated body of two or more layers of hot-melt sheets, it is preferable that a melting point of the hot-melt resin on the side contacted with the scintillator panel is higher than a melting point of the hot-melt resin on the side contacted with the planar light-receiving device. With such a configuration, for example, when the scintillator panel and the planar light-receiving device are heated and pressure-bonded, the hot-melt resin on the planar light-receiving device side has a low melting point and thus melts and exerts high adhesiveness to the planar light-receiving device. On the other hand, the hot-melt resin on the scintillator panel side has a high melting point and is thus difficult to melt. Accordingly, the penetration of this resin to the columnar crystals can effectively be suppressed.

The hot-melt sheet may be formed by applying the melted hot-melt resin using a die-coater or the like. Alternatively, a commercially available hot-melt sheet may be used.

From the viewpoint of workability, it is preferable that the hot-melt sheet is formed on a separator. There is no particular limit to the material of the separator. Sheets of paper, or plastic films such as polyethylene terephthalate (PET) films may be used. From the viewpoint of cleanness, plastic films such as PET films are preferable. In addition, from the viewpoint of peel properties, it is preferable that a release treatment of silicone or the like is performed on a surface of the separator, on which a hot-melt sheet is formed. The separator may be provided on one side or each of both sides of a hot-melt sheet. In order to prevent foreign particles from adhering to a surface of the hot-melt sheet during handling, it is preferable that the separators are provided on both sides of the hot-melt sheet.

In the case of using a hot-melt sheet in the adhesive layer, a scintillator panel and a planar light-receiving device can be joined to each other by inserting the hot-melt sheet between the scintillator panel and the planar light-receiving device and then heating the hot-melt sheet at a temperature from 50° C. to 150° C. under a pressure ranging from 10,000 Pa to 1,000,000 Pa. Setting the pressure to be at least 10,000 Pa or higher can adhesively bond together the scintillator panel and the planar light-receiving device uniformly without generating an air space. On the other hand, setting the pressure to be at least 1,000,000 Pa or lower can suppress damages to a phosphor. Thus the risk of damaging image quality is lowered. In the case of providing the separator on one side of the hot-melt sheet, it is preferable to divide the above adhesive-bonding process into two stages. That is, first, a surface of the hot-melt sheet, on which no separator is provided, is contacted with a surface of the scintillator panel and pressurized and heated under the above conditions. Thus, the hot-melt sheet can adhesively be bonded to the scintillator panel. Next, a separator provided on a surface of the hot-melt sheet, which is opposite to the surface thereof adhesively bonded to the scintillator panel, is peeled off. Then, the hot-melt sheet is contacted with a surface of the planar light-receiving device, and pressurized and heated under the above conditions. Thus, the scintillator panel and the planar light-receiving device can be joined to each other via the hot-melt sheet. Incidentally, in the foregoing description, an example has been described in which the hot-melt sheet and the scintillator panel are first adhesively-bonded to each other. Alternatively, the hot-melt sheet and the planar light-receiving device may first be adhesively-bonded to each other. In the case of providing the separators on both sides of the hot-melt sheet, it is advisable to use the same procedure as the above procedure after one of the separators, which is provided on one side of the hot-melt sheet, is peeled off.

A pressure sensitive adhesive sheet may be used as the adhesive layer in the present invention. An example of the pressure sensitive adhesive sheet that can be used as the adhesive layer in the present invention is what is called a double-sided tape, onto which a pressure sensitive adhesive is applied. Some of the pressure sensitive adhesive use, e.g., an acrylic resin, a urethane-based resin, a rubber-based resin, or a silicon-based resin as a main component. Among these resins, from the viewpoint of light transmissivity and adhesiveness, the pressure sensitive adhesives using the acrylic resin or the silicon-based resin as a main component is preferable. The commercially available double-sided tape is, e.g., No. 5601. No. 5603, No. 5605, or the like manufactured by Nitto Denko Corporation, No. 7027, No. 7029, or the like manufactured by Teraoka Seisakusyo Co., Ltd., and #5402, #5402A, #5405, #5405A, or the like manufactured by Sekisui Chemistry Corporation.

It is preferable that the pressure sensitive adhesive sheet that may be used in the present invention has no base material such as a PET film, and is formed of a simple substance of an adhesive agent.

In the case of using a pressure sensitive adhesive sheet as the adhesive layer, a pressure sensitive adhesive sheet is inserted into between the scintillator panel and the planar light-receiving device, and using a laminating device or the like, the scintillator panel and the planar light-receiving device can be joined to each other under a reduced pressure of 10,000 Pa to 1,000,000 Pa.

From the viewpoint of suppressing an optical loss at an interface, it is preferable that the refractive index of the adhesive agent in the present invention is in a range between those of members with which the adhesive agent is contacted, that is, between those of materials respectively configuring the outermost layers of the scintillator panel and the planar light-receiving device, or is comparable to the refractive index of at least one of the materials respectively configuring the outermost layers of the scintillator panel and the planar light-receiving device.

The refractive index of the adhesive layer can be adjusted to a desirable value by adding particles or the like thereto, if necessary. It is often that the adhesive agent is generally smaller in the refractive index than the scintillator layer. Thus, it is preferable to add fine particles having high refractive indices to the adhesive layer. Examples of the materials of the fine particles include alumina, yttrium oxide, zirconium oxide, titanium dioxide, barium sulfate, silica, zinc oxide, calcium oxide, calcium carbonate, glass, and resin. These materials may be used singly, or two or more thereof may be used in combination as a mixture. Among these materials of the particles, titanium dioxide is particularly preferable, because titanium dioxide has a high refractive index. The titanium dioxide may have any of crystal structures of rutile, brookite and anatase forms. However, from the viewpoint of large ratio of its refractive index to that of the resin, the attainability of a high luminance and the reflectance of visible light, the titanium dioxide having a crystal structure of the rutile form is particularly preferable. In order not to extremely degrade the transparency of the adhesive layer, the area-average particle diameter of the particles is preferably 1 nm to 50 nm, and more preferably 1 nm to 20 nm. In a case where the total volume of all of the components configuring the adhesive layer is taken as 100 vol %, the volume fraction of the particles included therein is preferably 3 vol % to 30 vol %, and more preferably 5 vol % to 20 vol %. If the volume fraction of the particles is within such a range, the refractive index can be enhanced without extremely degrading the transparency of the adhesive layer.

The hot-melt resin or the pressure sensitive adhesive sheet may include a spacer particle in order to obtain a spacer effect.

It is preferable that the particles included to obtain the spacer effect have particle diameters comparable to the thickness of the adhesive layer and also have refractive indices comparable to the refractive index of the material configuring the adhesive layer. Examples of the spacer particles include polymer particles, and glass beads, whose particle diameters are usually 1 μm to 50 μm. Adding such spacer particles to the adhesive layer enables that when the scintillator panel and the planar light-receiving device are bonded to each other, the film-thickness of the adhesive layer, i.e., the distance between the planar light-receiving device and the scintillator panel can be maintained uniformly in plane. Further, the resin configuring the adhesive-agent can be effectively suppressed from penetrating into the columnar crystals. In addition, from the viewpoint of suppressing the scattering of light at the interface between the resin configuring the adhesive layer, and the spacer particle, it is preferable to use the spacer particle having the refractive index comparable to that of the resin configuring the adhesive layer. Particularly, methyl methacrylate and a styrene copolymer are useful as the material of the spacer particle, because the refractive index can optionally be controlled in a range of 1.5 to 1.6 according to a composition ratio. Such a product is, e.g., Techpolymer manufactured by SEKISUI PLASTICS Co., Ltd.

The film-thickness of the adhesive layer is usually 1 μm to 100 μm, preferably, 1 μm to 30 μm, and more preferably 3 μm to 20 μm. Setting the lower limit of the film-thickness to be within the above range enables the securement of the adhesiveness between the scintillator panel and the planar light-receiving device. Further, suppressing the upper limit of the film-thickness to the above ranges enables that light emitted from the scintillator layer is suppressed from being scattered in the adhesive layer, and that an image with high sharpness can be obtained.

The hot-melt sheet is preferable as the adhesive layer in the present invention, from the following viewpoint.

The hot-melt sheet generates no adhesion force at room temperature. Therefore, in comparison with the pressure sensitive adhesive sheet, position adjustment is very easily performed in the case of the hot-melt sheet. That is, because an adhesion force is generated by heating and melting the hot-melt sheet after the scintillator panel and the planar light-receiving device are superimposed in a state in which no adhesion force is generated. Consequently, the position adjustment can be performed accurately and easily.

The elastic modulus of the hot-melt sheet at room temperature is generally larger than that of the pressure sensitive adhesive sheet. Thus, the adhesion strength of the hot-melt sheet is high. Particularly, in the case where the scintillator has a columnar structure, the hot-melt sheet moderately penetrates into between the columns of the scintillator. Consequently, the adhesiveness is more enhanced.

[Planar Light-Receiving Device]

Figure 4:
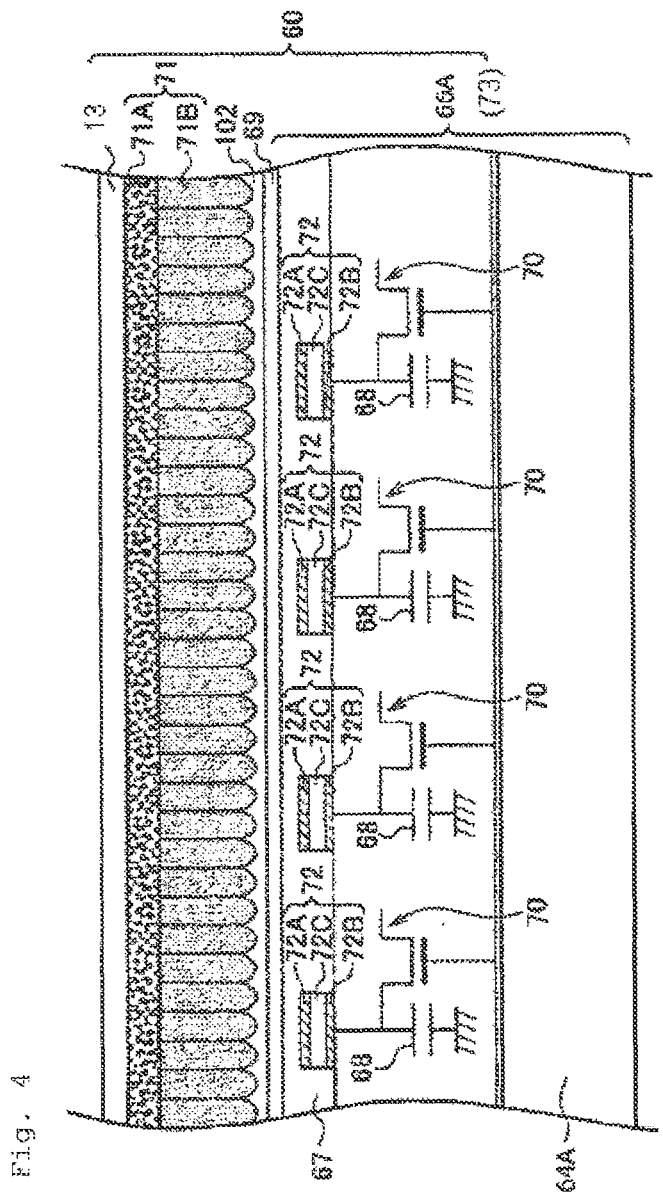
FIG. 4 is a cross-sectional diagram schematically illustrating a configuration of a radiation image detecting device according to the present invention.

The planar light-receiving device serves to convert light emitted from the scintillator layer into an electrical signal. The planar light-receiving device includes a substrate and a plurality of light-receiving elements arranged two-dimensionally on the substrate. An example of the planar light-receiving device is a TFT active matrix substrate (hereinafter referred to as a "TFT substrate") 66A in which thin-film transistors (TFT) 70 and storage capacitors 68 are formed on an insulating substrate 64A, as illustrated in FIG. 4. The TFT substrate 66A acts as the planar light-receiving device 73 illustrated in FIGS. 1 and 2. Thus, the planar light-receiving device has a configuration in which a plurality of light-receiving elements are arranged two-dimensionally, like the TFT active matrix substrate 66A. Specifically, such a planar light-receiving device is built in AeroDR manufactured by KONICA MINOLTA, INC., PaxScan (FPD manufactured by Varian Medical Systems, Inc.: 2520), or the like. Incidentally, in the following examples, a substrate configuring the planar light-receiving device may be referred to as a "support of the planar light-receiving device".

For example, the materials described in the foregoing section of the support of the scintillator panel can be used in the substrate, such as the insulating substrate 64A illustrated in FIG. 4, which configures the planar light-receiving device. Among such materials, glass plates, and polymer materials are preferable. From the viewpoint of flexibility, the polymer materials, particularly, resin films are preferable. Among the resin films, from the viewpoint of heat-resistance, a polyimide film is especially preferable. That is, according to the present invention, the substrate configuring the planar light-receiving device, which is formed of a glass plate or a resin film, is preferable. The substrate formed of a resin film is more preferable.

The elastic modulus of the planar light-receiving device is usually 0.1 GPa to 300 GPa, preferably from 1 GPa to 200 GPa, and more preferably from 1 GPa to 20 GPa. The definition of the "elastic modulus" is as mentioned above in the section "Support".

The thickness of the planar light-receiving device is usually 1 µm to 1,000 µm, preferably from 10 µm to 500 µm, and more preferably from 10 µm to 200 µm. In a case where the thickness of the planar light-receiving device is within the above range, even if the planar light-receiving device is made of a material, such as glass or metal, which has a large elastic modulus, when the planar light-receiving device and the scintillator panel are joined to each other, the planar light-receiving device can effectively be bent according to the film-thickness distribution of the scintillator layer. Thus, the planar light-receiving device and the scintillator layer can be joined to each other so that the distance therebetween via the adhesive layer is uniform in plane.

Incidentally, according to the present invention, as described in Examples to be discussed below, practically, the elastic modulus and the thickness of the substrate configuring the planar light-receiving device may be employed as those of the planar light-receiving device, respectively.

In the TFT substrate 66A, sensor units 72 are formed, which are caused by incidence of light converted by the scintillator layer 71 thereon to generate electric charge. In FIG. 4, the TFTs 70 and the sensor units 72 are formed in a manner that the TFTs 70 is placed on a layer different from a layer on which the sensor units 72 is placed and that the TFTs 70 are overlapped with the sensor units 72. Consequently, the light-receiving area of the sensor unit 72, which is used for receiving light from the scintillator layer 71, can be increased. Further, in the TFT substrate 66A, a planarization layer 67 for planarizing the top-surface of the TFT substrate 66A is formed. Furthermore, adhesive layer 69 for adhesively bonding the scintillator layer 71 to the TFT substrate 66A is formed between the TFT substrate 66A and the scintillator layer 71 and on the planarization layer 67.

The sensor unit 72 includes an upper electrode 72A, a lower electrode 72B, and a photoelectric conversion film 72C arranged between the upper and lower electrodes.

The upper electrode 72A, and the lower electrode 72B are formed using materials, such as ITO (indium tin oxide) and IZO (indium zinc oxide), which have high light transmissivity, and have light transmissivity.

The photoelectric conversion film 72C absorbs light emitted from the scintillator layer 71 and generates electric charges according to the absorbed light. It is sufficient that the photoelectric conversion film 72C is formed by a material caused by incidence of light thereupon to generate electric charges. Thus the photoelectric conversion film 72C may be formed by, e.g., amorphous silicon or organic photoelectric conversion materials. If the photoelectric conversion film 72C contains amorphous silicon, the photoelectric conversion film 72C has broad absorption spectra and can absorb light emitted from the scintillator layer 71. If the photoelectric conversion film 72C contains an organic photoelectric conversion material, the photoelectric conversion film 72C has a sharp absorption spectrum in a region of visible light and hardly absorbs electromagnetic waves other than light emitted from the scintillator layer 71. Thus, noise generated due to absorption of radiation such as X-rays by the photoelectric conversion film 72C can effectively be suppressed.

The organic photoelectric conversion materials include, for example, a quinacridone organic compound and a phthalocyanine organic compound. For example, an absorption peak wavelength in a visible light region of quinacridone is 560 nm. Thus, using quinacridone as the organic photoelectric conversion material, and CsI:Tl as the material of the scintillator layer 71 enables that the difference between the above peak wavelengths is equal to or less than 5 nm. Consequently, an amount of the electric charge generated in the photoelectric conversion film 72C can nearly be maximized. The above organic photoelectric conversion materials are described in Japanese Patent Application Laid-Open Publication No. 2009-32854. Incidentally, the photoelectric conversion film 72C may be formed so as to contain a fullerene-nanotube or carbon-nanotube.

Figure 5:
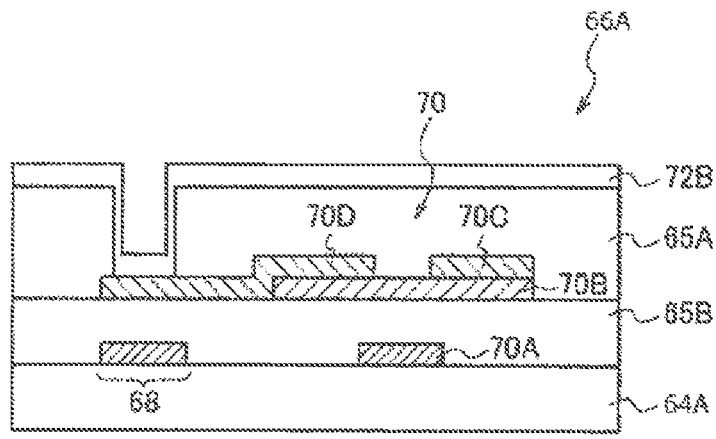
FIG. 5 is a cross-sectional diagram illustrating a thin-film-transistor and a capacitor in the radiation image detecting device according to the present invention.

FIG. 5 schematically illustrates a configuration in which the TFT 70 and the storage capacitor 68 are formed in the TFT substrate 66A.

On the insulating substrate 64A, the storage capacitor 68 which stores electrical charge transferred to the lower electrode 72B, and the TFT 70 which converts the electric charge stored in the storage capacitor 68 into electrical signals and outputs the electrical signals, are formed, corresponding to the lower electrode 72B. A region in which the storage capacitor 68 and the TFT 70 are formed has a portion overlapping in plan view with the lower electrode 72B. With such a configuration, the storage capacitor 68, the TFT 70, and the sensor unit 72 overlap with one another in the direction of thickness in each pixel portion. Thus, the storage capacitor 68, the TFT 70, and the sensor unit 72 can be arranged in a small area.

The storage capacitor 68 is electrically connected to the associated lower electrode 72B via a wiring made of an electrically conductive material formed so as to penetrate through the insulating film 65A provided between the insulating substrate 64A and the lower electrode 72B. Consequently, electric charges collected by the lower electrode 72B can be transferred to the storage capacitor 68.

In the TFT 70, a gate electrode 70A, a gate insulating film 65B, and an active layer (channel layer) 70B are stacked. In addition, a source electrode 70C, and a drain electrode 70D are formed at a predetermined interval on the active layer 70B. The active layer 70B may be formed using amorphous silicon, non-crystalline oxide, an organic semiconductor material or a carbon nanotube, or the like.

The non-crystalline oxide includes oxides each containing at least one of, e.g., indium (In), gallium (Ga), and zinc (Zn) (e.g., In—O oxides), preferably, oxides each containing at least of two of indium, gallium, and zinc (e.g., In—Zn—O oxides, In—Ga—O oxides, and Ga—Zn—O oxides), and more preferably an oxide containing indium, gallium, and zinc. The In—Ga—Zn—O non-crystalline oxides include preferably a non-crystalline oxide, whose composition in a crystalline state is represented by $InGaO_3$ (ZnO)$_m$ (m is a natural number being less than 6), and more preferably $InGaZnO_4$.

The organic semiconductor materials include, for example, phthalocyanine compounds, pentacene, and vanadyl-phthalocyanine. Incidentally, the configuration of phthalocyanine compounds is described in detail in Japanese Patent Application Laid-Open Publication No. 2009-212389.

If the active layer 70B of the TFT 70 is formed using an amorphous oxide, an organic semiconductor materials, or a carbon nanotube, the active layer 70B does not absorb radiation such as X-rays. Even if the active layer 70B absorbs radiation, an amount of the absorbed radiation is extremely small. Thus, occurrence of noise can effectively be suppressed. Further, in a case where the active layer 70B is formed using a carbon nanotube, the switching speed of the TFT 70 can be increased. Thus, the TFT 70 can be formed whose absorption of light is low in a region of visible light. Incidentally, in the case of forming the active layer 70B using a carbon nanotube, even if an extremely small amount of metallic impurity is mixed into the active layer 70B, the performance of the TFT 70 is extremely reduced. Therefore, it is necessary to form the active layer 70B by separating and extracting an extremely-high-purity carbon nanotube through a centrifugal separation.

Here, all of amorphous oxides, organic semiconductor materials, carbon nanotubes configuring the active layer 70B of the TFT 70, and organic photoelectric conversion materials configuring the photoelectric conversion film 72C can be formed at low temperature. Accordingly, the material of the insulating substrate 64A is not limited to high-heat-resistance substrates such as a quartz substrate and a glass substrate. Polymer materials having been described above as the material of the support may be used as the material of the insulating substrate 64A. Incidentally, an insulating layer, a gas barrier layer for preventing a moisture and oxygen from penetrating through the insulating substrate 64A, an undercoat layer for enhancing the flatness or the adhesiveness to the electrode or the like may be provided in the insulating substrate 64A.

Incidentally, image sensors such as CCD or CMOS may be used as the planar light-receiving device.

[Radiation Image Detecting Device]

The radiation image detecting device includes, in order, the scintillator panel including the support and the scintillator layer on the support, the scintillator layer having a film-thickness distribution, the adhesive layer, and the planar light-receiving device. In this configuration, the scintillator panel is joined to the planar light-receiving device under heat from 50° C. to 150° C., and preferably from 60° C. to 120° C. so that the distance between the scintillator panel and the planar light-receiving device via the adhesive layer is uniform in plane. Thus, the radiation image detecting device is produced.

Further, it is preferable that the scintillator panel is joined to the planar light-receiving device under pressure of 10,000 Pa to 1,000,000 Pa, and preferably 100,000 Pa to 500,000 Pa, in addition to the above heating condition.

Consequently, the planar light-receiving device and the scintillator panel can be joined so that the distance therebetween via the adhesive layer is uniform. Accordingly, a radiation image detecting device can be provided, which shows good image-sharpness and suppresses image irregularities.

Figure 6:
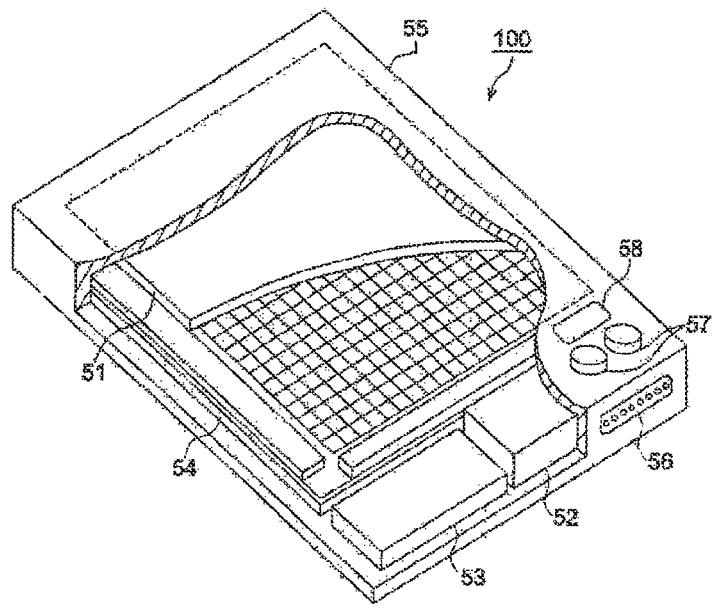
FIG. 6 is a partially cutaway perspective diagram illustrating an outline configuration of a radiation image detecting device according to the present invention.

Here, the outline configuration of the radiation image detecting device is described with reference to FIG. 6. The radiation image detecting device 100 includes the following units provided in a casing 55, that is, an imaging panel 51, a control unit 52 that controls an operation of the radiation image detecting device 100, a memory unit 53 serving as a storing means that stores image signals output from the imaging panel 51 using a rewritable dedicated memory (e.g., a flash memory) or the like, a power supply unit 54 serving as an electric-power supply means that supplies electric-power needed to obtain image signals by driving the imaging panel 51, and so on. In the casing 55, the following units are optionally further provided, that is, a communication connector 56 for allowing the radiation image detecting device 100 to communicate with an external device, an operation unit 57 for changing an operation of the radiation image detecting device 100, a display unit 58 indicating completion of preparation for taking a radiation image, and also indicating that a predetermined amount of image signals is written to the memory unit 53, and so on. Furthermore, the radiation image detecting device 100 can be configured into a portable structure, in which the power supply unit 54 is provided, and in which the memory unit 53 that stores image signals representing radiation images is provided, by setting the radiation image detecting device 100 via the connector 56 to be detachable.

In the above radiation image detecting device, it is the imaging panel 51 that includes the scintillator panel having the support and the scintillator layer on the support, and the planar light-receiving device.

EXAMPLES

Hereinafter, the present invention is described in detail with reference to examples. However, the present invention is not limited to these examples.

Example 1

Manufacture of Scintillator Panel

After sputtering silver (Ag) on a 0.5 mm-thick glass support (dimensions: 430 mm×430 mm), Vylon 20SS (manufactured by Toyobo Co., Ltd.) was coated thereon so as to make a dry film thickness to 3 μm, to give a substrate for vapor-deposition. Then, on the substrate, a phosphor material (CsI(Tl)) (0.3 mol %) was vapor-deposited by using a vapor-deposition apparatus 61 as illustrated in FIG. 3. Thus, a scintillator layer was formed.

Specifically, the phosphor material (CsI(Tl)) (0.3 mol %) was charged in a resistance-heating crucible (boat 63). The support was installed in a substrate holder 64. The distance between the support and the vapor-deposition source was adjusted to 400 mm.

Next, the inside of the vapor-deposition apparatus was once evacuated. Then, argon (Ar) gas was introduced thereto, and the degree of vacuum was adjusted to 0.5 Pa. After that, the temperature of the substrate for vapor-deposition 12 was maintained at 150° C. while the substrate for vapor-deposition 12 was rotated at a rate of 10 rpm. Then, the phosphor was vapor-deposited by heating the resistance-heating crucible. When the film-thickness reached 400 μm, the vapor-deposition was completed, to give a scintillator panel as described in Table 1-1.

(Manufacture of Hot-Melt Sheet)

After an ethylene-vinyl acetate copolymer (whose melting point was 70° C.) was melted at 200° C., a hot-melt sheet having a film-thickness of 15 μm was manufactured by using an extrusion coater.

(Manufacture of Radiation Image Detecting Device)

The scintillator panel and a planar light-receiving device of AeroDR (FPD manufactured by KONICA MINOLTA, INC.) were bonded to each other via an adhesive layer (the above-mentioned hot-melt sheet), to give a radiation image detecting device. Incidentally, bonding was performed by arranging the hot-melt sheet between the planar light-receiving device and the scintillator panel in a manner in which a surface of the planar light-receiving device, on which the sensor unit existed, and the scintillator panel faced each other via the hot-melt sheet, and by then heating the hot-melt sheet in a state in which a pressure of 100 kPa was applied thereto on conditions that a temperature was 75° C., and that a heating-time was 15 minutes.

Examples 2 to 10 and Reference Example 1

Radiation image detecting devices were manufactured in the same manner as in Example 1, except that tan θ of the scintillator layer, and the materials and the film-thicknesses of the support, the planar light-receiving device, and the adhesive layer were changed, as described in Tables 1-1 and 1-2. Here, in Examples 7 and 8, the planar light-receiving device having a polyimide substrate was used, instead of the planar light-receiving device having a glass substrate. Incidentally, tan θ of the scintillator layer was adjusted according to the distance between the support and the vapor-deposition source. That is, the value of tan θ was reduced by increasing the distance between the support and the vapor-deposition source, while the value of tan θ was increased by reducing the distance between the support and the vapor-deposition source.

Example 11

A radiation image detecting device was manufactured in the same manner as in Example 2, except that a pressure sensitive adhesive sheet (No. 5603 manufactured by Nitto Denko Corporation) was used, instead of the hot-melt sheet of Example 2, and that a heating treatment was not performed.

Example 12

A radiation image detecting device was manufactured in the same manner as in Example 2, except that a material obtained by stacking two types of ethylene-vinyl acetate copolymers was used instead of the hot-melt sheet of Example 2, one of the ethylene-vinyl acetate copolymers having a melting point of 70° C. (film-thickness: 10 μm) and the other having a melting point of 75° C. (film-thickness: 5 μm). Incidentally, the laminated body of the hot-melt sheets was manufactured by separately melting the materials of the hot-melt sheets at 200° C. and then performing coextrusion thereon. The hot-melt surface having a melting point of 70° C. was set on the planar light-receiving device side, while the hot-melt surface having a melting point of 75° C. was set on the scintillator side.

Example 13

A radiation image detecting device was manufactured, similarly to Example 2, except that spacer particles having an average particle-diameter of 15 μm (Techpolymer manufactured by SEKISUI PLASTICS Co., Ltd.) were added at a volume fraction of 10% to the hot-melt sheet of Example 2.

Example 14

After a 0.5 mm-thick glass plate was adhesively bonded via the hot-melt sheet to the back surface of the scintillator panel manufactured in Example 6, the hot-melt sheet was adhesively bonded to the planar light-receiving device in the same manner as in Example 1, to give a radiation image detecting device.

[Evaluation of Scintillator Panel]

A MTF (modulation transfer function) test, an image irregularity test, and an impact resistance test were performed according to the following methods on the radiation image detecting devices obtained by the Examples 1 to 14, and the Reference Example 1. Thus, the scintillator panels respectively configuring these radiation image detecting devices were evaluated. Results are described in Table 1-3.

MTF

X-rays were irradiated at a tube voltage of 80 kVp to a radiation incidence side of the FPD through a lead MTF chart. Image data was detected and recorded on a hard disk. Then, the data recorded on the hard disk was analyzed by a computer. Thus, MTF values (at a spatial frequency of 1 cycle/mm) of an X-ray image recorded on the hard disk was employed as an index of sharpness. The higher the MTF value, the scintillator panel more excels in sharpness.

The MTF values were measured at 9 locations in the scintillator panel, and the average of the measured MTF values was evaluated. The characteristics of scintillator panels vary largely depend on the film-thickness of the scintillator layers. Thus, sharpness was evaluated by relative evaluation in which the panels having the same thickness of the scintillator layers were compared with one another.

Image Irregularities

Images before gain correction were obtained by irradiating X-rays at a tube voltage of 80 kVp to each flat panel display (FPD). The image irregularities of such images were evaluated by calculating the value of $(S_{max}-S_{av})/S_{av}$ and the value of $(S_{av}-S_{min})/S_{av}$ where $S_{av}$ represents an average value of an image-signal-level, $S_{max}$ represents a maximum value thereof, and $S_{min}$ represents a minimum value thereof. If one of such values is equal to or higher than 10%, the rating of the FPD is indicated by a symbol "x". If one of such values is equal to or higher than 5% and is less than 10%, the rating of the FPD is indicated by a symbol "Δ". If one of such values is equal to or higher than 2% and is less than 5%, the rating of the FPD is indicated by a symbol "○". If one of such values is less than 2%, the rating of the FPD is indicated by a symbol "⊙".

Impact Resistance

A flat display panel (FPD) was allowed to drop onto a floor from a height of 1 m, once for each of the six faces of the FPD, and then the image irregularities were evaluated for the FPD, similarly to the above test. Such a test was performed for each of the FPDs. If the adhesiveness between the scintillator panel and the planar light-receiving device was poor, detachment was caused by the impact due to the drop of the FPD. Thus, image irregularities were increased. That is, images were deteriorated.

TABLE 1-1

| | Scintillator Layer | | Support for Scintillator Panel | | | |
|---|---|---|---|---|---|---|
| | Material | Angle of Slope tanθ | Material | Elastic Modulus GPa | Film Thickness mm | tanθ*E*d |
| Example 1 | CsI(Tl) | 0.0005 | Glass | 65 | 0.5 | 0.016 |
| Example 2 | CsI(Tl) | 0.0020 | Glass | 65 | 0.5 | 0.065 |
| Reference Example 1 | CsI(Tl) | 0.0040 | Glass | 65 | 0.5 | 0.130 |
| Example 3 | CsI(Tl) | 0.0020 | Glass | 65 | 0.1 | 0.013 |
| Example 4 | CsI(Tl) | 0.0020 | Amorphous Carbon | 23 | 0.5 | 0.023 |
| Example 5 | CsI(Tl) | 0.0020 | Aluminum | 70 | 0.5 | 0.070 |
| Example 6 | CsI(Tl) | 0.0040 | Polyimide | 5 | 0.1 | 0.002 |
| Example 7 | CsI(Tl) | 0.0040 | Glass | 65 | 0.5 | 0.130 |
| Example 8 | CsI(Tl) | 0.0040 | Polyimide | 5 | 0.1 | 0.003 |
| Example 9 | CsI(Tl) | 0.0020 | Glass | 65 | 0.5 | 0.065 |
| Example 10 | CsI(Tl) | 0.0020 | Glass | 65 | 0.5 | 0.065 |
| Example 11 | CsI(Tl) | 0.0020 | Glass | 65 | 0.5 | 0.065 |
| Example 12 | CsI(Tl) | 0.0020 | Glass | 65 | 0.5 | 0.065 |
| Example 13 | CsI(Tl) | 0.0020 | Glass | 65 | 0.5 | 0.065 |
| Example 14 | CsI(Tl) | 0.0020 | Polyimide/ Glass | 65 | 0.5 | 0.065 |

TABLE 1-2

| | Support for Planar Light-Receiving Device | | | | Adhesive layer | |
|---|---|---|---|---|---|---|
| | Material | Elastic Modulus GPa | Film Thickness mm | tanθ*E*d | Material | Film Thickness μm |
| Example 1 | Glass | 65 | 0.5 | 0.016 | Hot-Melt (Melting Point 70°) | 15 |
| Example 2 | Glass | 65 | 0.5 | 0.065 | Hot-Melt (Melting Point 70°) | 15 |
| Reference Example 1 | Glass | 65 | 0.5 | 0.130 | Hot-Melt (Melting Point 70°) | 15 |
| Example 3 | Glass | 65 | 0.5 | 0.065 | Hot-Melt (Melting Point 70°) | 15 |
| Example 4 | Glass | 65 | 0.5 | 0.065 | Hot-Melt (Melting Point 70°) | 15 |
| Example 5 | Glass | 65 | 0.5 | 0.065 | Hot-Melt (Melting Point 70°) | 15 |
| Example 6 | Glass | 65 | 0.5 | 0.130 | Hot-Melt (Melting Point 70°) | 15 |
| Example 7 | Polyimide | 5 | 0.1 | 0.002 | Hot-Melt (Melting Point 70°) | 15 |
| Example 8 | Polyimide | 5 | 0.1 | 0.002 | Hot-Melt (Melting Point 70°) | 15 |
| Example 9 | Glass | 65 | 0.5 | 0.065 | Hot-Melt (Melting Point 70°) | 3 |
| Example 10 | Glass | 65 | 0.5 | 0.065 | Hot-Melt (Melting Point 70°) | 30 |
| Example 11 | Glass | 65 | 0.5 | 0.065 | Pressure Sensitive Adhesive Sheet | 30 |
| Example 12 | Glass | 65 | 0.5 | 0.065 | Hot-Melt (Melting Point 70°)/ Hot-Melt (Melting Point 75°) | 10/5 |
| Example 13 | Glass | 65 | 0.5 | 0.065 | Hot-Melt + Spacer | 15 |
| Example 14 | Glass | 65 | 0.5 | 0.065 | Hot-Melt | 15 |

TABLE 1-3

| | MTF | Image Irregularities | Impact Resistance |
|---|---|---|---|
| Example 1 | 0.62 | ○ | ○ |
| Example 2 | 0.60 | ○ | Δ |
| Reference Example 1 | 0.54 | X | X |
| Example 3 | 0.60 | ○ | ○ |
| Example 4 | 0.60 | ○ | ○ |
| Example 5 | 0.60 | ○ | Δ |
| Example 6 | 0.62 | ⊚ | ⊚ |
| Example 7 | 0.62 | ⊚ | ⊚ |
| Example 8 | 0.68 | ⊚ | ⊚ |
| Example 9 | 0.66 | ○ | Δ |
| Example 10 | 0.55 | ○ | ○ |
| Example 11 | 0.55 | ○ | Δ |
| Example 12 | 0.64 | ○ | ○ |
| Example 13 | 0.64 | ○ | ○ |
| Example 14 | 0.60 | ○ | ○ |

REFERENCE NUMERAL LIST 12 substrate for vapor-deposition
13 support
51 imaging panel
52 control unit
53 memory unit
54 power supply unit
55 casing
56 connector
57 operation unit
58 display unit
60 radiation image detecting device
61 vapor-deposition apparatus
62 vacuum container
63 boat
64A insulating substrate
64 substrate holder
65 rotating mechanism
65a rotating shaft
65A insulating film
65B gate insulating film
66A TFT active matrix substrate
66 vacuum pump
67 planarization layer
68 storage capacitor
69 adhesive layer
70 thin-film transistor (TFT)
70A gate electrode
70B active layer
70C source electrode
70D drain electrode
71 scintillator layer
71A non-columnar crystal region
71B columnar crystal region
72 sensor unit
72A upper electrode
72B lower electrode
72C photoelectric conversion film
73 planar light-receiving device
100 radiation image detecting device
102 sealing unit

What is claimed is:

1. A radiation image detecting device comprising, in order:
a scintillator panel comprising a support and a scintillator layer on the support, the scintillator layer having a film-thickness distribution;
an adhesive layer; and
a planar light-receiving device,
wherein at least one of the support and the planar light-receiving device bends, so that the scintillator panel and the planar light-receiving device are arranged in plane via the adhesive layer at uniform distance.

2. The radiation image detecting device according to claim 1,
wherein, when the elastic modulus of the support is defined as E1 (GPa) and a film-thickness of the support is defined as d1 (mm), an angle of maximum slope θ of a surface of the scintillator layer to a plane direction of the scintillator layer satisfies a relation expressed by the following expression (1):

$$\tan\theta \times E1 \times d1 \leq 0.1 \tag{1}$$

or wherein, when the elastic modulus of the planar light-receiving device is defined as E2 (GPa) and a film-thickness of the planar light-receiving device is defined as d2 (mm), an angle of maximum slope θ of a surface of the scintillator layer to a plane direction of the scintillator layer satisfies a relation expressed by the following expression (2):

$$\tan\theta \times E2 \times d2 \leq 0.1 \tag{2}$$

3. The radiation image detecting device according to claim 1, wherein the film-thickness of the adhesive layer ranges from 1 μm to 30 μm.

4. The radiation image detecting device according to claim 1, wherein the adhesive layer is a layer containing one type or two or more types of hot-melt resins.

5. The radiation image detecting device according to claim 4, wherein the adhesive layer is a laminated body of two or more types of layers, and wherein the two or more types of layers are formed of hot-melt resins differing in melting point from one another.

6. The radiation image detecting device according to claim 5, wherein, in the laminated body, a melting point of the hot-melt resin forming a layer touching the scintillator layer is higher than a melting point of the hot-melt resin forming a layer touching the planar light-receiving device.

7. The radiation image detecting device according to claim 4, wherein the adhesive layer contains, in addition to the one type or two or more types of hot-melt resins, a spacer particle having a particle diameter comparable to the film-thickness of the adhesive layer and having a refractive index comparable to that of the hot-melt resins.

8. The radiation image detecting device according to claim 1, wherein the scintillator layer is formed by vapor-deposition.

9. The radiation image detecting device according to claim 8, wherein the scintillator layer is formed by vapor-depositing a phosphor material including cesium iodide and at least one type of an activator agent.

10. The radiation image detecting device according to claim 1, wherein the support is configured by a glass plate or a resin film.

11. The radiation image detecting device according to claim 10, wherein the support is configured by a resin film.

12. The radiation image detecting device according to claim 1, wherein a substrate configuring the planar light-receiving device is configured by a glass plate or a resin film.

13. The radiation image detecting device according to claim 12, wherein a substrate configuring the planar light-receiving device is configured by a resin film.

14. A process for producing a radiation image detecting device,
wherein the radiation image detecting device comprises, in order,
a scintillator panel comprising a support, and a scintillator layer on the support, the scintillator layer having a film-thickness distribution;
an adhesive layer; and
a planar light-receiving device, and
wherein the process comprises a step of joining the scintillator panel to the planar light-receiving device under heat from 50° C. to 150° C. so that the distance between the scintillator panel and the planar light-receiving device via the adhesive layer is uniform in plane.

15. The process according to claim 14, wherein the adhesive layer is a layer containing one type or two or more types of hot-melt resins, and wherein melt-viscosities of the hot-melt resins range from 100 Pa·s to 100,000 Pa·s.

16. The process according to claim 14, wherein the joining of the scintillator panel to the planar light-receiving device is performed, in addition to under heat from 50° C. to 150° C., under pressure of 10,000 Pa to 1,000,000 Pa.

* * * * *